(12) United States Patent
Stewart et al.

(10) Patent No.: US 12,416,295 B2
(45) Date of Patent: *Sep. 16, 2025

(54) GEOTHERMAL SOURCE POWER GENERATION PLANT WITH COMPUTING FACILITY AND METHOD

(71) Applicants: Gregory B. Stewart, Long Beach, CA (US); Vincent B. Bunting, Long Beach, CA (US); Glenn T. Tucker, Petaluma, CA (US); Gregory B. Raplee, Rancho Palos Verdes, CA (US); Brian Hageman, Sun City, AZ (US)

(72) Inventors: Gregory B. Stewart, Long Beach, CA (US); Vincent B. Bunting, Long Beach, CA (US); Glenn T. Tucker, Petaluma, CA (US); Gregory B. Raplee, Rancho Palos Verdes, CA (US); Brian Hageman, Sun City, AZ (US)

( * ) Notice: Subject to any disclaimer, the term of this patent is extended or adjusted under 35 U.S.C. 154(b) by 223 days.

This patent is subject to a terminal disclaimer.

(21) Appl. No.: 18/448,112

(22) Filed: Aug. 10, 2023

(65) Prior Publication Data

US 2024/0044317 A1 Feb. 8, 2024

Related U.S. Application Data

(60) Continuation-in-part of application No. 18/108,276, filed on Feb. 10, 2023, now abandoned, which is a continuation of application No. 17/175,499, filed on Feb. 12, 2021, now Pat. No. 11,578,705, which is a division of application No. 15/935,929, filed on Mar. 26, 2018, now Pat. No. 10,920,753.

(60) Provisional application No. 62/477,483, filed on Mar. 28, 2017.

(51) Int. Cl.
   *F28D 7/00* (2006.01)
   *F03G 7/04* (2006.01)
   *F24D 3/18* (2006.01)

(52) U.S. Cl.
   CPC ................. *F03G 7/04* (2013.01); *F24D 3/18* (2013.01); *F24D 2200/11* (2013.01); *F24D 2200/12* (2013.01)

(58) Field of Classification Search
   CPC .......... F03G 7/04; F24D 3/18; F24D 2200/11; F24D 2200/12
   USPC ......................................................... 165/45
   See application file for complete search history.

(56) References Cited

U.S. PATENT DOCUMENTS 11,578,705 B2 * 2/2023 Stewart ...................... F24D 3/18
2006/0213502 A1 * 9/2006 Baker ...................... F24S 90/00
                                                           126/568

* cited by examiner

*Primary Examiner* — Davis D Hwu
(74) *Attorney, Agent, or Firm* — West & Associates, A PC; Stuart J. West; Charlotte Rodeen-Dickert

(57) ABSTRACT

A method of processing electrical data and signals which comprises locating a site with a geothermal hot water resource which feeds hot water to an on-site heat engine that drives an on-site electricity generator which provides electrical power to an array of microprocessors, located in an enclosure structure, that processes data transmitted from a remote location at high speeds. The processed data is transmitted back to the remote locations at high speeds.

17 Claims, 13 Drawing Sheets

GEOTHERMAL SOURCE POWER GENERATION PLANT WITH COMPUTING FACILITY AND METHOD

CROSS-REFERENCE TO RELATED APPLICATION(S)

This application is a continuation-in-part of prior-filed and co-pending U.S. patent application Ser. No. 18/108,276, filed Feb. 10, 2023, which is a continuation of prior-filed and U.S. patent application Ser. No. 17/175,499, filed Feb. 12, 2021 (now U.S. Pat. No. 11,578,705) which is a divisional of U.S. patent application Ser. No. 15/935,929, filed Mar. 26, 2018 (now U.S. Pat. No. 10,920,753) which claims the benefit of U.S. Provisional Patent Application No. 62/477,483, filed Mar. 28, 2017, the entireties of each of which are hereby incorporated herein by reference.

Any and all U.S. patents, U.S. patent applications, and other documents, hard copy or electronic, cited or referred to in this application are incorporated herein by reference and made a part of this application.

REFERENCES CITED—U.S PATENT DOCUMENTS

U.S. Pat. No. 4,747,271 A May 1988 Fischer
U.S. Pat. No. 5,899,067 A May 1999 Hageman
U.S. Pat. No. 9,869,274 B2 Jan. 2018 Fuhrman

Definitions

The words "comprising," "having," "holding," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND

Electronic signals processing and data processing facilities, because they use a large amount of electricity, are dependent upon adequate power supply. Such facilities may be and are hindered or constrained by the need for suitable electrical power generation and electrical transmission infrastructure to serve them. Moreover, the growing amount of electrical power required for computing derived from business, government, and the general public is burdening the conventional electrical grid and can be disruptive in some urban locations, or will be so in the near future. The electricity used for computing is often costly. Also, it is rarely renewable and therefore its production creates negative environmental impacts often including the release of greenhouse gases and other pollutants. Currently, four percent of global electrical generation is consumed by electronic signals processing facilities, requiring huge power generation and transmission infrastructure and resulting in significant release of pollutants. Conventional data centers have tried, when possible, to locate in areas with lower cost electricity. Some data center companies have purchased renewable energy power plants such as wind and solar, and sold power into a local grid in an effort to offset their overall electrical carbon footprint.

Renewable energy power plants which produce electricity from geothermal (hot water) resources address the primary negative environmental impact of power generation, but typically have relied on the use of very hot water and steam, which typically is available only from very deep wells. Geothermal power plants which could operate on lower temperature water have not been considered viable due to their very low operating efficiency and resulting high cost of electricity produced. Furthermore, electricity from geothermal power plants is often produced in remote areas because these are the areas that have significant geothermal resources. Such power plants are remote from adequate electric power grid connections and therefore require significant expense and effort to create adequate connections to the power grid.

SUMMARY

We have discovered that inexpensive, clean (non-polluting) electricity from renewable energy sources can be generated from low temperature (typically 140 degrees F. up to the boiling point of water) geothermal wells or other low temperature geothermal resources. This electricity in turn can be used for on-site electronic signals processing, thereby eliminating the need to put the electricity generated into the conventional electric power grid or otherwise transport it over long distances. Low temperature geothermal wells or other low temperature geothermal resources (usually less than 210° F.) have typically been limited to uses such as space heating and domestic water heating for residential, greenhouse, or industrial buildings, provided a need for these uses exists within a reasonable proximity. In other words, low temperature geothermal resources have historically had very limited utility and low economic value. Our on-site power generation with electronic signals processing facilities is a more valuable use of the energy available from low temperature geothermal sources. Low temperature geothermal resources can be embodied as a warm water aquifer, or warm body of water including but not limited to: hot springs, boiling lakes and hydrothermal vents located on land and hydrothermal vents submerged in the ocean. Our electronic signals processing facilities may be located in a remote location which has a low temperature geothermal resource. Our on-site power generation with electronic signals processing facility includes a low temperature geothermal resource utilized to generate electricity with a hydraulic heat engine. The hydraulic heat engine drives a hydraulic motor which turns a generator which generates electricity which is used to run computing equipment. Due to the low cost of internet connectivity over optical fiber and microwave frequencies it is feasible to locate the electronic signals processing facility in remote and rural areas. This method enables locating the facility remotely from the conventional electrical grid and thereby eliminates significant costs and constraints placed on conventional computing facilities. Rather than generating electrical power and transporting that power over long distances to a location where it can be used, instead, raw data and other items unrelated to data in need of processing is transmitted to the site of our facility and electrical power generated at the site is used on-site for computing and the resulting processed data is then transmitted to remote locations using conventional data transmission systems. This approach takes advantage of the fact that data transmission systems are considerably less costly and more efficient than power transmission systems. Our method makes low temperature geothermal resources, including those in remote and rural locations, viable for the high grade, high value use of electronic signals and some other specific types of processing.

In our method the hot water from the geothermal resource is usually above 140 degrees Fahrenheit and is in fluid communication with the hydraulic heat engine. In one embodiment, a drive piston of the engine is actuated to produce high pressure hydraulic fluid, which runs a hydraulic motor that turns a shaft of an electrical generator to produce electrical power. The hydraulic heat engine utilizes heat exchangers to transfer thermal energy from the geothermal resource to the heat engine working fluid, which in one embodiment is liquid carbon dioxide. The working fluid undergoes thermal expansion (without phase change from liquid to gas) which drives a piston of the hydraulic heat engine. The piston movement pressurizes hydraulic fluid which runs the hydraulic motor. An onsite cooling system or cold water resource provides cooling water which causes the working fluid to contract and re-positions the piston for another cycle. The process is then repeated. The hydraulic heat engine can obtain an efficiency of electrical power generation of at least 10 percent with a geothermal resource temperature as low as 140 degrees Fahrenheit.

Although there are other types of heat engines that are capable of generating electricity using water at temperatures similar to those available from low-heat geothermal water wells, they operate at considerably lower efficiencies and therefore produce higher cost electricity. Hence, low-heat geothermal water wells are considered to be economically stranded. Under federal law, when electricity generated from renewable sources including low heat geothermal resources is fed into the conventional power grid it must be purchased by local power companies at their "avoided cost" price. This "avoided cost" price is often too low to provide economic viability for other types of low-heat geothermal power plants. Our on-site power generation with electronic signals processing facility is economically viable because the heat engine is relatively efficient even with low temperature water, and the electrical power generated on-site is utilized on-site in its entirety by the electronic signals processing facility or other on-site non-computing related use. Due to the "avoided cost" price structure offered by power companies, substituting on-site computing or other services provides a more viable revenue stream.

One embodiment of a hydraulic heat engine combined with a generator such as that sold by Deluge, Inc. and covered under U.S. Pat. Nos. 5,899,067 and 5,916,140 may be used in our computing facility and method. Such combined units have low maintenance requirements, are not malodorous, and have a much lower noise level compared to conventional geothermal installations which rely on higher temperature water, such as those exemplified by Cal-Pine in Lake County, Calif. Our computing facility and method provide an on-site, direct use of renewable energy, at a significantly lower cost, which greatly reduces greenhouse gas emissions and reduces potentially disruptive electric grid burdens.

One embodiment of our electronic signals processing facility utilizes immersion cooling of the computing equipment. This method typically requires a footprint of one-tenth the square footage utilized by conventional computing facilities. With immersion cooling technologies our method utilizes a fraction of the electricity required by traditional computing facilities to cool the equipment, thereby allowing a cooling Power Utilization Efficiency (PUE) as low as 1.07 or lower. This is much lower than the typical PUE experienced with air cooled systems in traditional computing facilities. Our electronic signals processing facility requires less space and less electricity and therefore has a lower environmental impact.

One embodiment of immersion cooling such as that sold by Green Revolution Cooling, Inc. may be used in our electronic signals processing facility and method. These computing cooling systems contain the following improved features:
1. Modular allowing for rapid deployment and scalability
2. Low in Capital Expense
3. Minimal computing cooling Power Utilization Efficiency
4. High siting versatility
5. Efficient space utilization
6. High computing density and application variability
7. Low visual impact Our electronic signals processing facility and method have one or more of the features depicted in the embodiments discussed in the section entitled "DETAILED DESCRIPTION OF SOME ILLUSTRATIVE EMBODIMENTS." The claims that follow define the systems and methods provided herein, distinguishing them from the prior art. However, without limiting the scope of our electronic signals processing facility and method as expressed by these claims, in general terms, some, but not necessarily all, of their features are:

1. A site (a physical area) with geothermal resources in the form of low temperature (typically 140 degrees F. to 212 degrees F. or hotter) water.
2. A well drilled on the site to a depth which taps into a hot water aquifer and produces adequate hot water flow of an adequate temperature to serve the energy requirement of the computing or other facility, or an intake pipe placed in a hot lake, hot spring or other source of geo-thermally heated water which is capable of withdrawing adequate hot water flow of an adequate temperature to serve the energy requirement of the computing or other facility.
3. A device (such as a submersible or other pump) which moves hot water from the well or other geothermal resource to a heat engine through an arrangement of piping and control valves.
4. A heat engine and generator combination which uses energy from the hot water to produce electricity.
5. A cold water well and/or cooling system to produce cooling water for the heat engine.
6. An enclosure(s) which house(s) computing equipment and its cooling equipment.
7. Electronic signals processing equipment and its cooling equipment.
8. Data transmission systems such as fiber optic cable or microwave transmission systems to effect internet connectivity to and from clients and/or entities or transmission systems for other types of media.
9. A control system to manage all aspects of the electronic signals processing facility and regulate electrical generation.

The site listed in 1 above should have its geothermal resource in a location that allows sufficient access to that resource by work crews and equipment which will be used to install the items which withdraw water from the resource. Wells drilled into the geothermal aquifer should have adequate diameter (typically between 6 and 24 inches) to allow the amount of water flow needed to serve the power plant. The heat engine must be capable of operating to produce power using the amount and temperature of water available from the geothermal resource. Cooling systems for both the heat engine and the electronic signals processing equipment must be capable of producing the required cooling capacity during all ambient (outside) air temperatures and coincident relative humidity normally expected at the site.

These features are not listed in any rank order nor is this list intended to be exhaustive.

The steps of our method do not need to be performed in the above sequence.

BRIEF DESCRIPTION OF THE DRAWINGS

The present invention is illustrated by way of example, and not by way of limitation, in the figures of the accompanying drawings and in which like reference numerals refer to similar elements and in which:

The illustrative embodiment described herein is for a facility which uses a single geothermal hot water supply well, a single heat engine with a nominal output rating of 250 KW, one of several feasible cooling systems, and two enclosed structures which house computing equipment. Other possible embodiments include multiples of this arrangement, for example, two heat engines with four enclosure structures or three heat engines with six enclosure structures, etc. Multiple heat engines can also be served by multiple hot water wells and multiple cooling systems as necessary to achieve the desired heating and cooling load capacities.

One embodiment of our computing facility and method is discussed in detail in connection with the accompanying drawings, which are for illustrative purposes only. The drawings include the following figures (Figs.), with like numerals and letters indicating like parts:

FIG. 1 is a schematic illustration of one embodiment of our electronic signals processing facility and method.

FIG. 2 is a schematic illustration of a pair of enclosures which house computing equipment on the site of a geothermal water well providing hot water with the physical characteristics needed to operate a heat engine.

FIG. 3 is a schematic illustration of the configuration of piping of hot water from the geothermal water well and cooling water from the cooling system or cooling well to an array of heat engines in one embodiment which uses multiple heat engines to produce electricity to run computing or other equipment.

Figure 4:
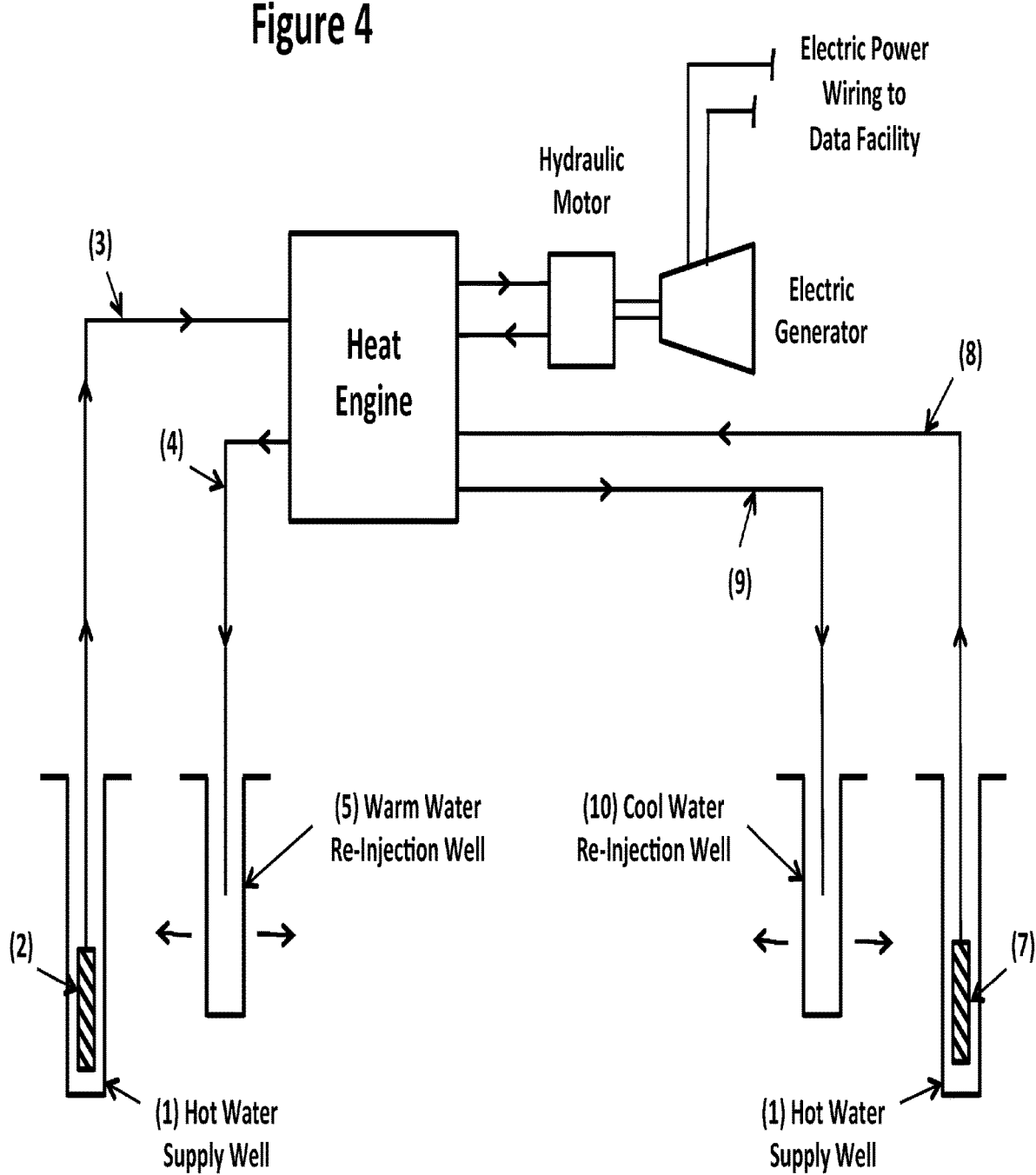

FIG. 4 is a schematic cross-sectional illustration of a low-temperature (140 degrees F. to 212 degrees F. or hotter) geothermal hot water well with a pressure activated water moving device (such as a submersible or other type of pump) in the well connected via piping to a heat engine, and a cold water well showing a pressure activated water moving device (such as a submersible or other type of pump) in the well connected via piping to the heat engine.

Figure 5:
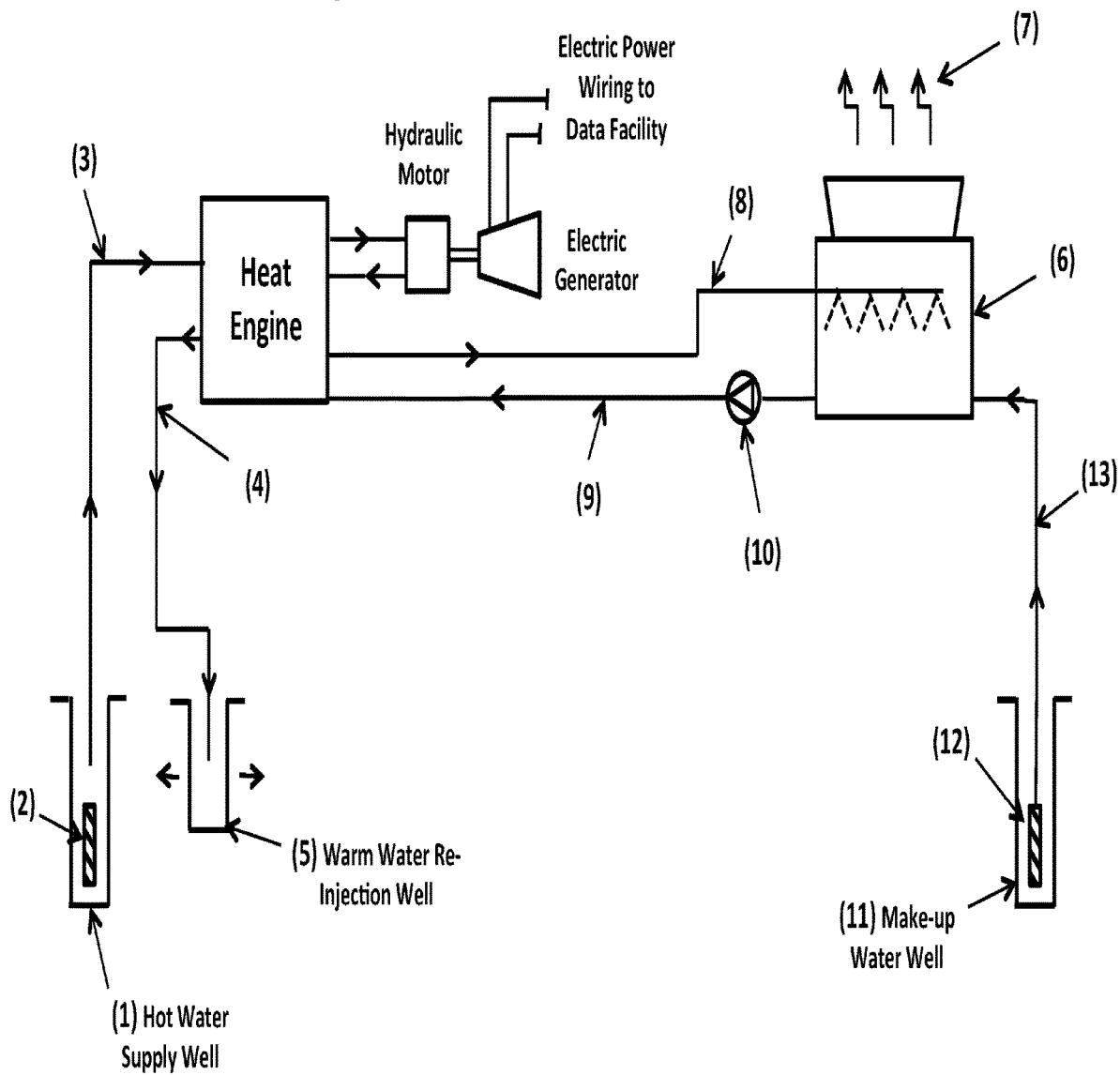

FIG. 5 is a schematic cross-sectional of a low-temperature (140 degrees F. to 212 degrees F. or hotter) geothermal hot water well showing a pressure activated water moving device (such as a submersible or other type of pump) in the well connected via piping to a heat engine, and a conventional cooling tower to provide chilled water connected via piping to the heat engine.

Figure 6:
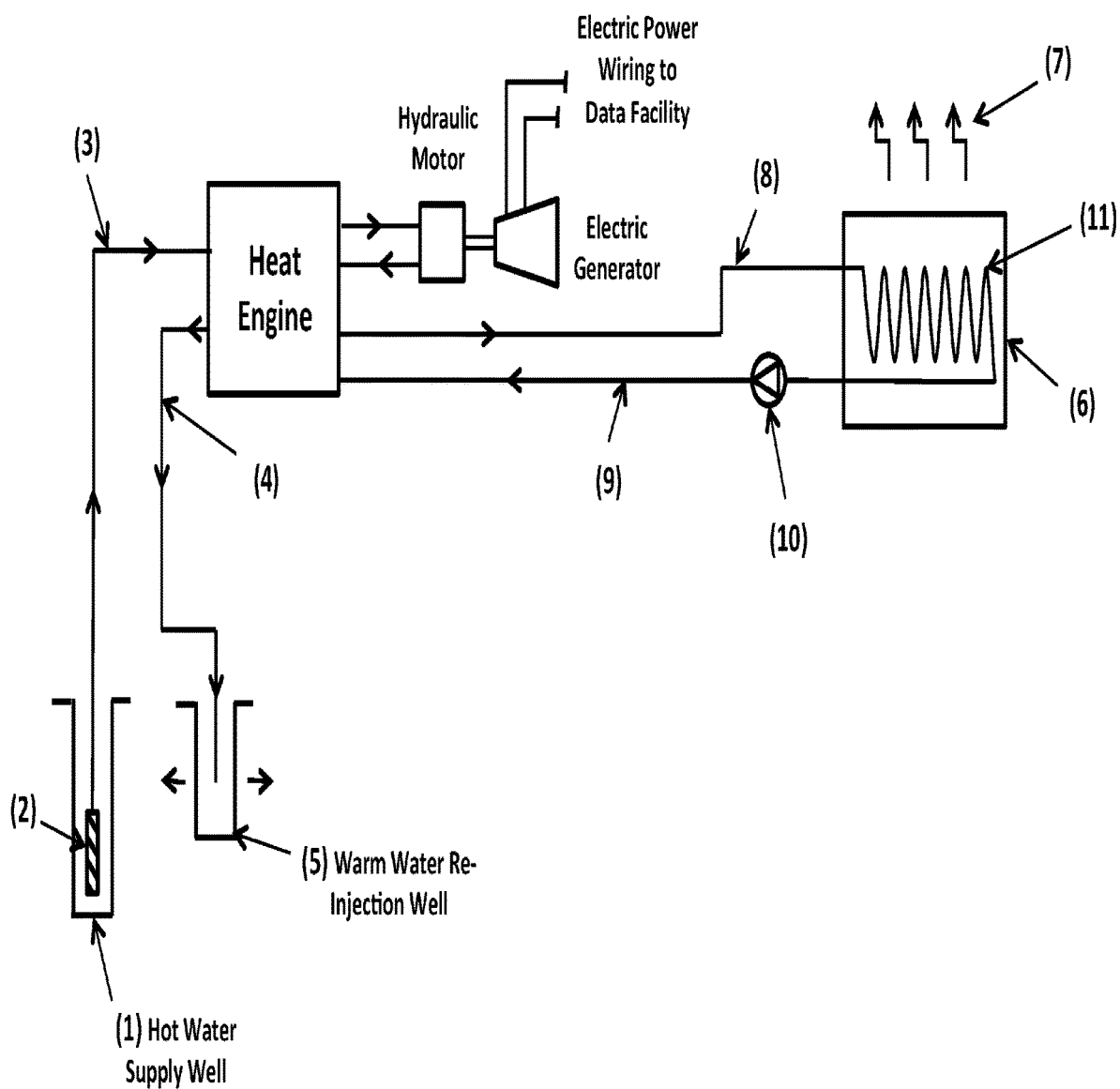

FIG. 6 is a schematic cross-sectional illustration of a low-temperature (140 degrees F. to 212 degrees F. or hotter) geothermal hot water well showing a pressure activated water moving device (such as a submersible or other type of pump) in the well connected via piping to a heat engine and a conventional dry cooler to provide cooling water connected via piping to the heat engine.

Figure 7:
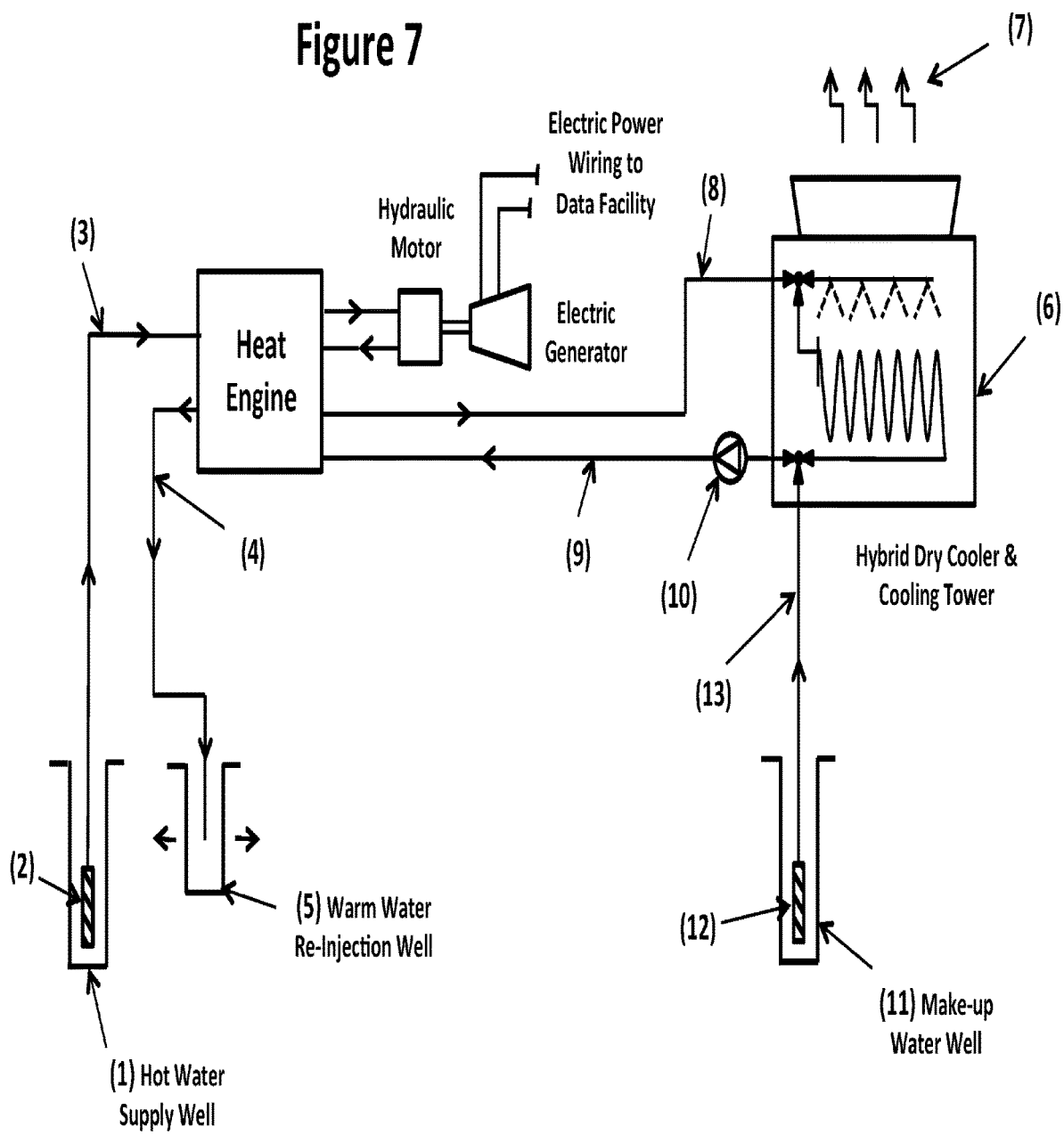

FIG. 7 is a schematic cross-sectional illustration of a low-temperature (140 degrees F. to 212 degrees F. or hotter) geothermal hot water well showing a pressure activated water moving device (such as a submersible or other type of pump) in the well connected via piping to a heat engine and a hybrid water cooler combining a cooling tower and dry cooler to provide cooling water connected via piping to the heat engine.

Figure 8:
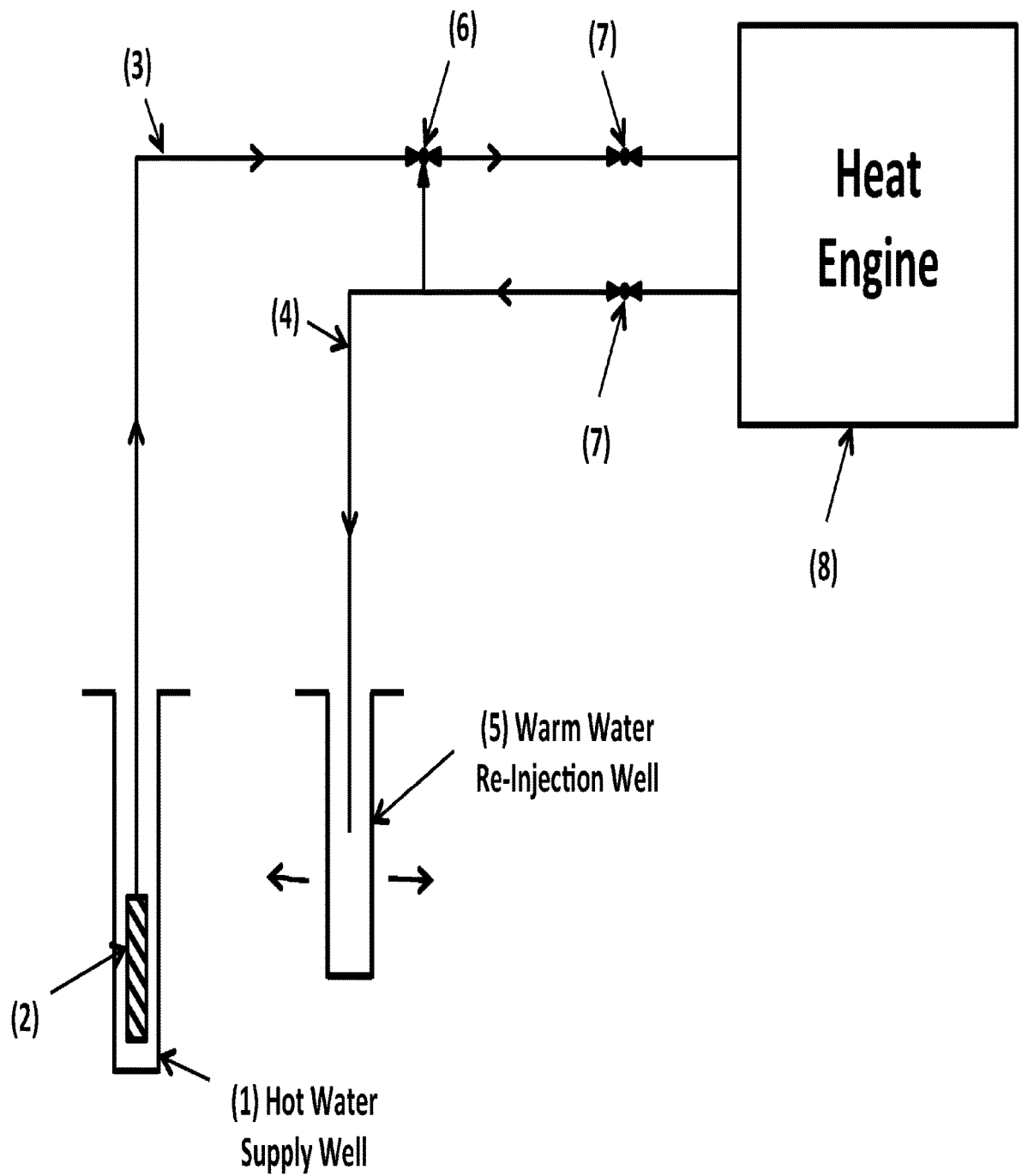

FIG. 8 is a schematic illustration of the piping and control valves which deliver hot water from the geothermal well to the heat engine. Piping and control valves which deliver cooling water to the heat engine are similar to the piping and control valves which deliver hot water from the geothermal well to the heat engine.

Figure 9:
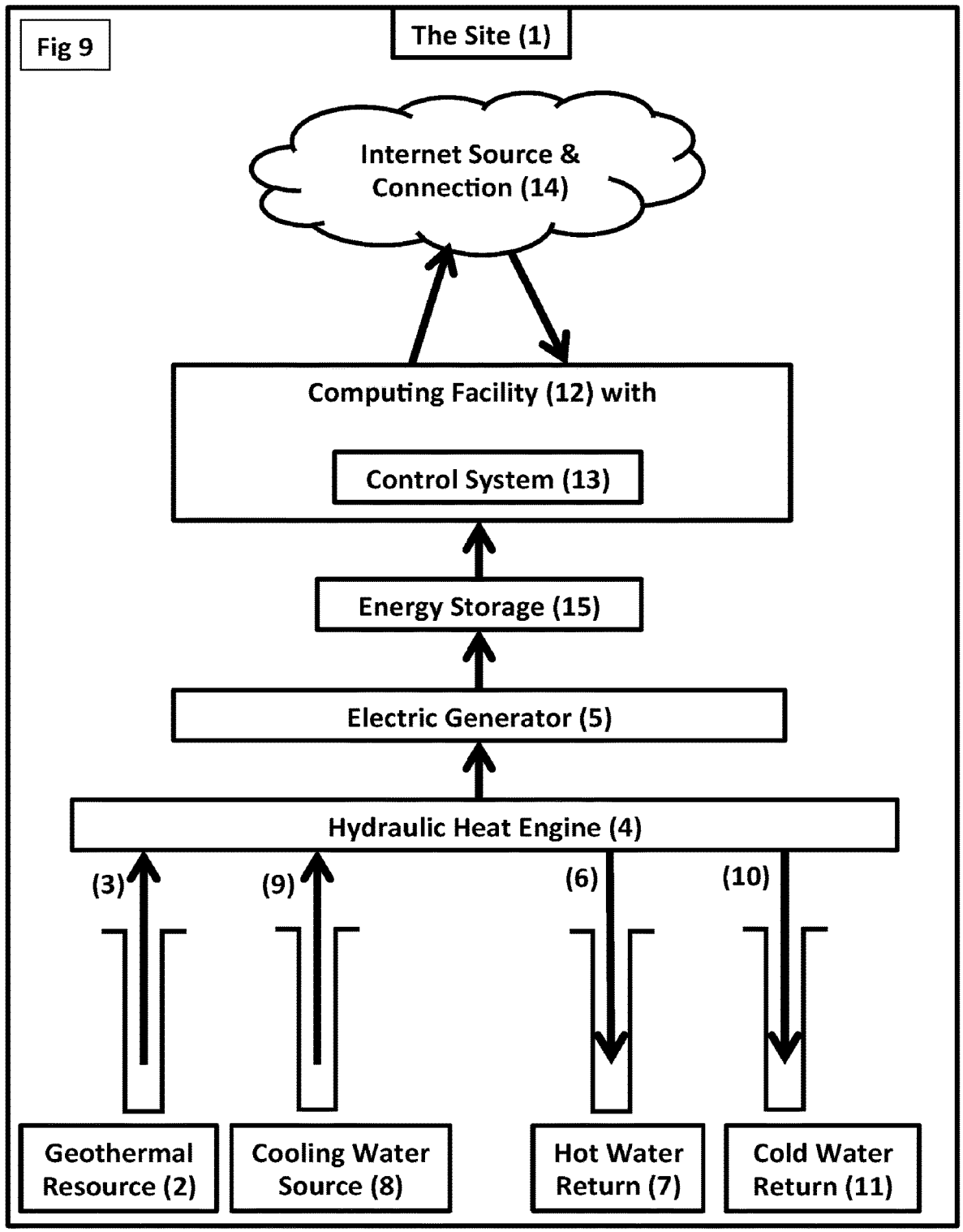

FIG. 9 is a schematic illustration of one embodiment of our electronic signals processing facility and method which shows a typical configuration of the major components of onsite power generator with electronic signals processing facility.

Figure 10:
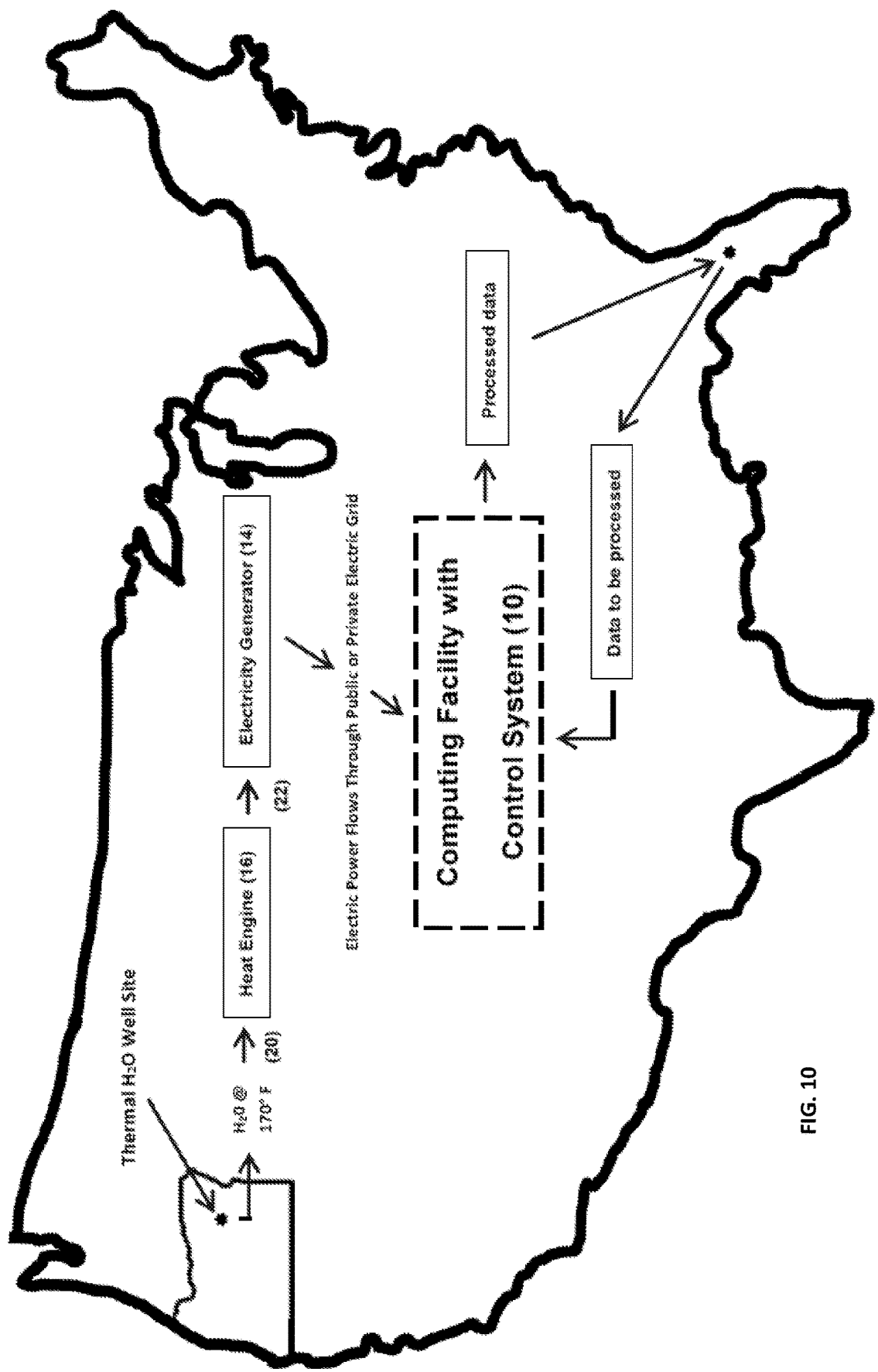

FIG. 10 is a schematic illustration of an embodiment of our electronic signals processing facility and method which includes a geothermal power plant and a computing facility at two different locations with power moving from the power plant to the computing facility through a public or private power grid.

Figure 11:
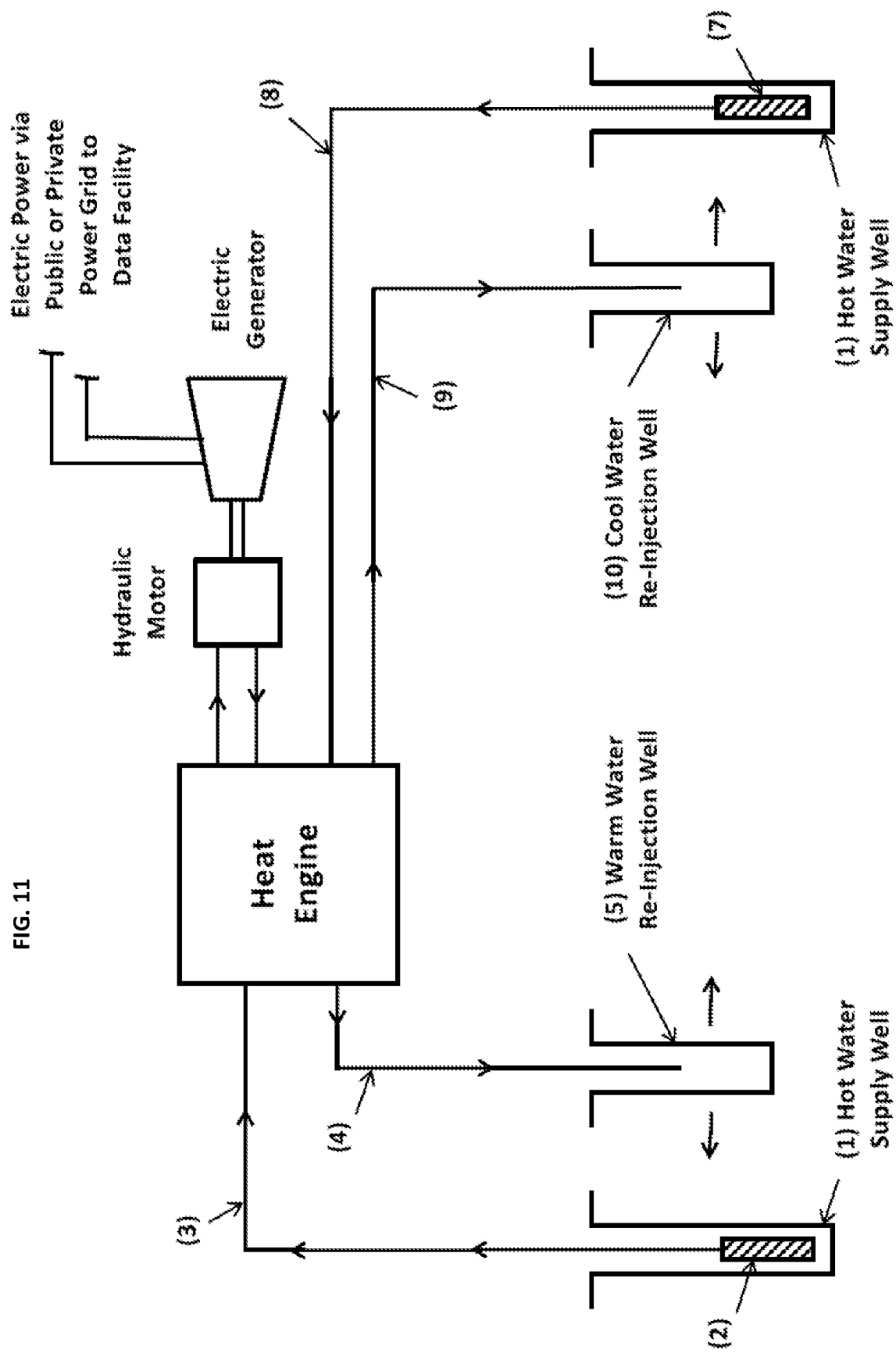

FIG. 11 is a schematic cross-sectional illustration of a geothermal hot water well with a pressure activated water moving device (such as a submersible or other type of pump) in the well connected via piping to a heat engine, and a cold water well showing a pressure activated water moving device (such as a submersible or other type of pump) in the well connected via piping to the heat engine with power moving from the electrical generator to the computing facility through a public or private power grid.

Figure 12:
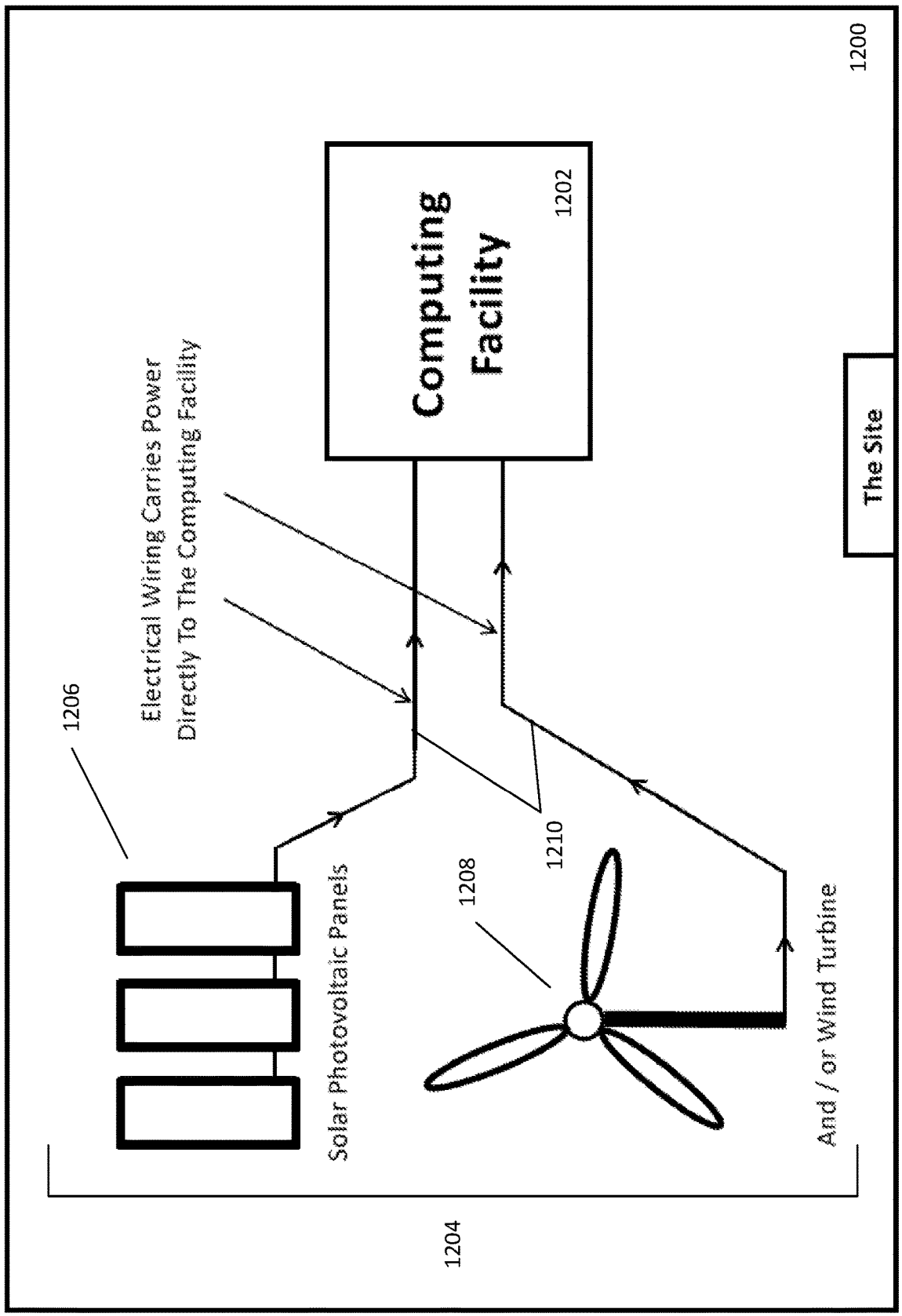

FIG. 12 is a schematic illustration of a facility/site housing computing equipment on the site of an alternate energy source.

Figure 13:
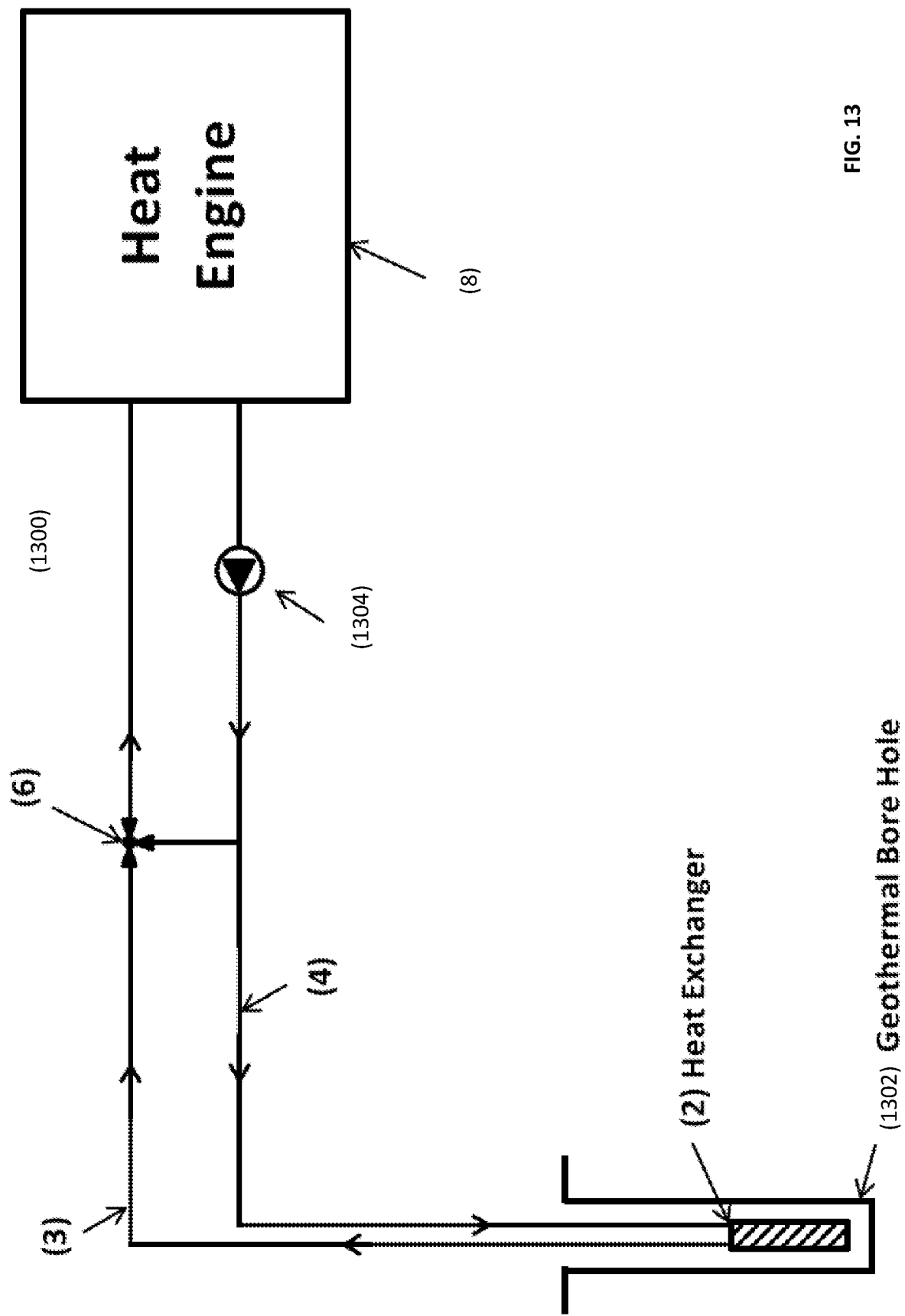

FIG. 13 is a schematic illustration of an alternate embodiment of the piping and control valves which deliver heat from the geothermal well to the heat engine through the use of a heat exchanger located in the geothermal well.

Unless otherwise indicated illustrations in the figures are not necessarily drawn to scale.

DETAILED DESCRIPTION

The present invention is best understood by reference to the detailed figures and description set forth herein.

The illustrative embodiment described herein is for a facility which uses a single geothermal hot water supply well, a single heat engine with a nominal output rating of 250 KW, one of several feasible sources of cooling water, and two enclosed structures which house electronic signals processing equipment and its respective cooling systems. Other possible embodiments include multiples of this arrangement, for example, two heat engines with four enclosure structures or three heat engines with six enclosure structures, etc. Multiple heat engines can also be served by multiple hot water and cold water wells and multiple pieces of cooling equipment as necessary to achieve the desired heating and cooling capacities.

Figure 1:
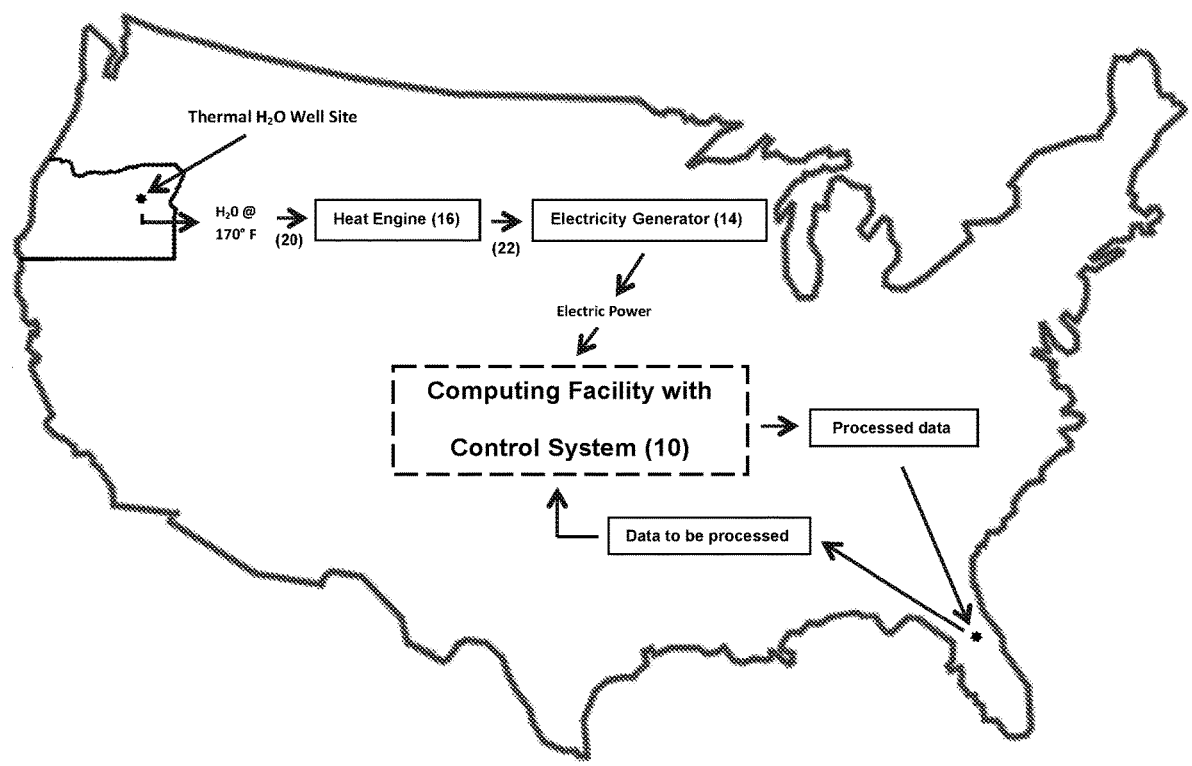
Figure 2:
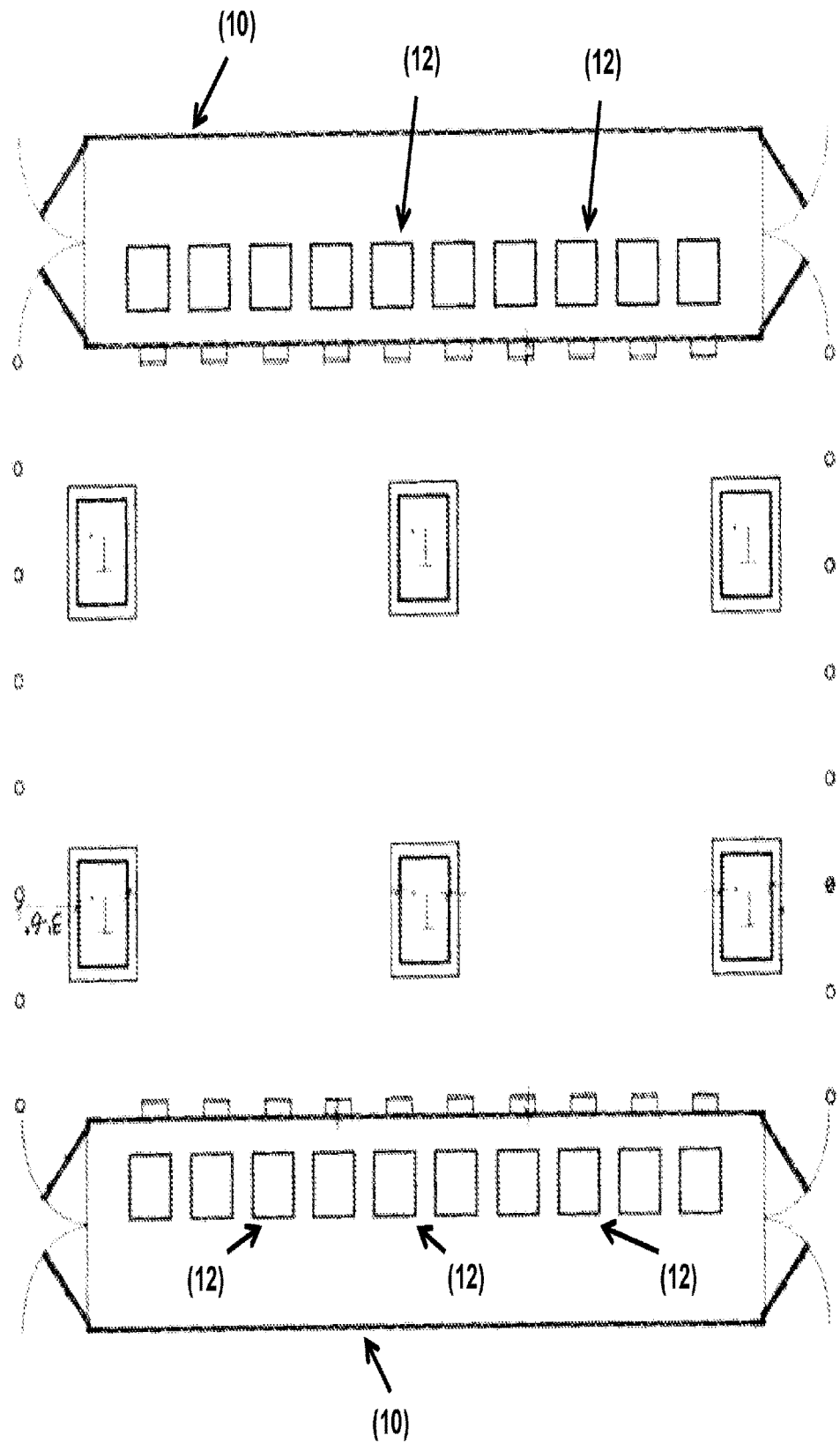

As depicted in FIG. 1, our Electronic Signals Processing Facility or Computing Facility includes an enclosed structure (10) (a pair of such structures are shown in FIG. 2) located on a site having a geothermal water well that provides hot water at a temperature from 140 degrees Fahrenheit to the boiling point of water or hotter. For example, the Eastern part of the State of Oregon in the United States has suitable sites with geothermal resources meeting required criteria including water temperature and quantity of available water. The geothermal resource sites are tested to determine their temperature and flow characteristics prior to installation of the enclosed structure (10). The site has an area typically larger than one acre. The enclosed structure (10) is located on the site of the geothermal water well and contains Data Processing Module "DPM" which generally refers to one or more computing devices running software configured to receive requests, typically over a network. A data processing module may include one or more servers connected to a network and running software configured to receive requests from other computing devices on the network, which may include other servers, and desktop and mobile computing devices, including cellular phones. Such data processing modules typically include one or more processors, memory, input/output connections to a network and other electronic components, and may include specialized computing devices such as blade servers, network routers, data acquisition equipment disc drive arrays, and other devices commonly associated with computing facilities. The controls for the electronic signals processing facility include the following features and components. Raw, unprocessed digital data is delivered to the electronic signals processing facility via fiber optic or microwave transmission networks operated by others. The data is processed by electronic signals processing equipment located in the computing equipment enclosures according to algorithms provided by the supplier of the data. The computing equipment which performs the electronic signals processing runs on electricity, and the amount of electrical power used is a function of the amount of data being processed. Processing larger amounts of data requires a larger amount of electrical power. Because the amount of data being processed varies over time, the electrical power requirement of the facility also varies over time. This requires a control system which regulates the flow of electricity to the processing equipment to match the changing load profile of the computing equipment.

A hydraulic heat engine (16) on the same site as the geothermal well drives the electricity generator (14). This hydraulic heat engine (16) operates at an efficiency of at least 10% or greater when driven by hot water at a temperature from 140 degrees Fahrenheit to the boiling point of water or hotter.

The engine (16) has an inlet (20) in communication with hot water from the geothermal well and an output drive (22) operably connected to the electricity generator (14).

As depicted in FIG. 2 one embodiment contains two enclosed structures (10) located on the site of the geothermal water well and which structures contain Data Processing Modules "DPM" (12) as described above in the detailed description of FIG. 1.

Figure 3:
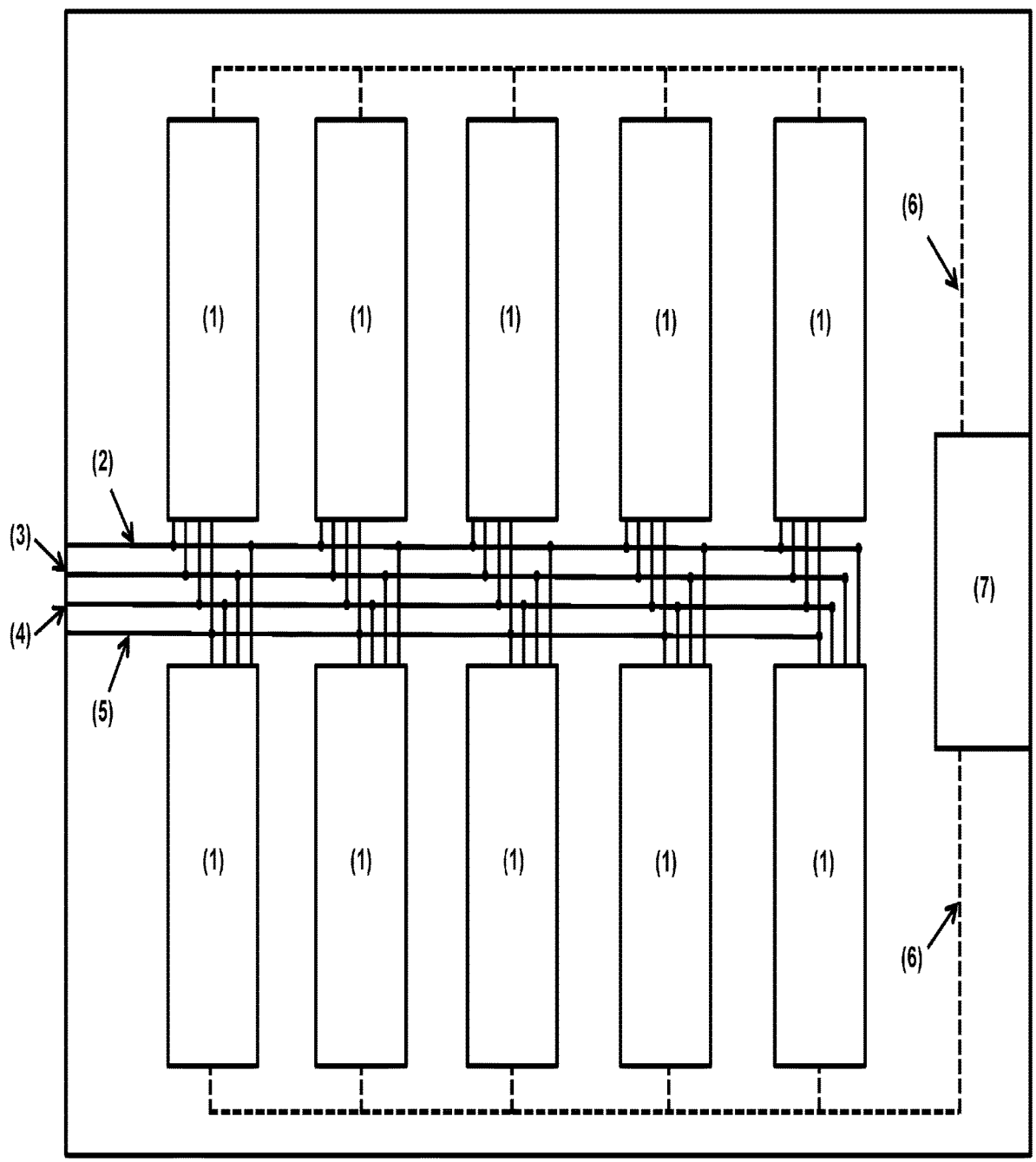

FIG. 3 shows one embodiment which uses multiple heat engines to produce electricity to run computing equipment. In this embodiment, there are ten heat engine/generator modules (1). Hot water piping (2) from the geothermal resource delivers hot water to each of the heat engines and return piping (3) returns the spent hot water to an injection well or other receptacle. Cold water piping (4) from the cooling source delivers cold water to each of the heat engines and return piping (5) returns the spent cold water to an injection well or other receptacle. Electrical conduits with electrical wiring in them (6) deliver electricity from each generator to the central electrical control room (7). Electrical power is fed from the control room to the Data Processing Modules on the site.

In FIG. 4 a hot water supply well (1) provides a source of geothermal hot water. The depth of the well depends on the depth of a hot water aquifer or geothermal resource at a particular site and can range from 150 ft to 1000 ft deep. The diameter of the well depends on the amount of hot water available at the site and the required hot water flow rate for the capacity of the electronic signals processing facility to be located at the site and can range from 6 inches to 24 inches. A key feature of our system and methods provided herein is that the heat engine can run effectively to produce electricity using a relatively low temperature geothermal water source with water between 140 degrees F. and the boiling temperature of water or hotter. Therefore, the geothermal well can be relatively shallow since it only needs to reach water in above described temperature range. This is in contrast with other types of heat engines and turbines which require much higher temperature water and/or steam to operate efficiently and therefore require much deeper and more expensive wells to reach water at higher temperatures and pressures.

A submersible pump (2), in the hot water well, pumps water from the well to the heat engine via hot water supply pipe (3). The size of the pump and pipe will depend on the capacity required for a particular computing or other facility. The pump to serve a single heat engine with a nominal generating capacity of 250 Kilowatts will require an approximate flow rate for the following temperatures:

220 gpm (gallons per minute) when the hot water supply is at 160 F
140 gpm when the hot water supply is at 185 F
105 gpm when the hot water supply is at 200 F Hot water from the supply well (1) is pumped to the heat engine where it passes through a heat exchanger which is integral to the heat engine. The heat exchanger is where the water transfers its heat to the working fluid of the heat engine. The working fluid of the heat engine expands (without changing phase) and drives a piston or pistons in the heat engine. The supply water which has released its useful heat exits the heat exchanger and flows through pipe (4) to an injection well (5). The water returns to its source via the injection well. The capacity (gpm) of the injection well (5) to release water into the ground is approximately the same as the supply rate of the pump (2) in the supply well (1).

Similarly, a cooling water supply well (6) provides a source of cool ground water which is used to cool the working fluid of the heat engine. After the working fluid at one end of the heat engine piston or pistons is heated and expands, the working fluid is cooled and contracts so that the cycle can be repeated. The effect of the expansion of the working fluid on the piston(s) is to generate motive power, which is then converted into electrical power via a hydraulic motor and electrical generator. The depth of the cold water well depends on the depth of a cold water aquifer at a particular site and can range from 150 ft to 1000 ft deep. The diameter of the well depends on the amount of cold water available at the site and the required hot water flow rate for the capacity of the electronic signals processing facility to be located at the site and can range from 6 inches to 36 inches.

A submersible pump (7) in the cold water well pumps water from the well to the heat engine via cold water supply pipe (8). The size of the pump and pipe will depend on the capacity required for a particular electronic signals processing facility. The pump to serve a single heat engine with a nominal generating capacity of 250 Kilowatts will require an approximate flow rate for the following temperatures:

156 gpm when the cold supply water is at 55 F
200 gpm when the cold supply water is at 65 F
280 gpm when the cold supply water is at 75 F Cold water from the supply well (6) is pumped to the heat engine where it passes through a heat exchanger which is integral to the heat engine. The heat exchanger is where the water removes heat from the working fluid of the heat engine. The working fluid of the heat engine contracts (without changing phase) and drives a piston or pistons in the heat engine. The supply water which has extracted heat from the heat engine working fluid exits the heat exchanger and flows through pipe (9) to an injection well (10). The water returns to its source via the injection well. The capacity (gpm) of the injection well (10) to release water into the ground is approximately the same as the supply rate of the pump (7) in the supply well (6). In an alternate embodiment, the injection well is eliminated and pipe (9) sends the spent cooling water to a pond, lake, stream, ocean or other site specific receptacle.

FIG. 5 is a variation on the system shown in FIG. 4 and employs a different source of cool water for the heat engine. In FIG. 5 items (1) through (5) are the same as in FIG. 4. In lieu of a cold water well, a cooling tower (6) provides cooling water for the heat engine. The cooling tower is a conventional, commercially available cooling tower designed and sized to operate at the ambient environmental conditions anticipated at a particular site. The cooling tower removes heat from the water flowing through it by spraying the water over surfaces in the tower which promote evaporative cooling of the water. The tower releases both sensible and latent heat into the atmosphere (7) either by convection or by fan assisted air flow.

The cooled water is pumped by chilled water pump (10) through pipe (9) to the heat exchanger inside the heat engine. Since some water is lost through evaporation, the cooling tower requires make-up water to replace the lost water. Cold water well (11) supplies this make-up water. Submersible pump (12) inside the well pumps water via pipe (13) to the cooling tower. The flow rate of the pump and pipe will be a function of the size of the electronic signals processing facility and local environmental conditions, but typical make-up water flow rate for the nominal 250 KW system is 8 to 10 gpm. An alternate source of make-up water could be from spent heating water diverted from pipe (4).

FIG. 6 is a variation on the system shown in FIG. 4 and employs a different source of cool water for the heat engine. In FIG. 6 items (1) through (5) are the same as in FIG. 4. In lieu of a cold water well, a dry cooler (6) provides cooling water for the heat engine. The dry cooler is a piece of cooling equipment designed and sized to operate at the ambient environmental conditions anticipated at a particular site. The dry cooler removes heat from the water flowing through it by running the water through a heat exchanger (11) which releases heat into the air. The dry cooler releases only sensible (no latent) heat into the atmosphere (7) either by convection or by fan assisted air flow.

The cooled water is pumped by chilled water pump (10) through pipe (9) to the heat exchanger inside the heat engine and then returns to the dry cooler via pipe (8).

FIG. 7 is a variation on the system shown in FIG. 4 and employs a different source of cool water for the heat engine. In FIG. 7 items (1) through (5) are the same as in FIG. 4. In lieu of a cold water well, a hybrid cooling tower/dry cooler (6) provides cooling water for the heat engine. The cooling tower/dry cooler is a conventional, commercially available unit designed and sized to operate at the ambient environmental conditions anticipated at a particular site. The cooling unit removes heat from the water flowing through it by functioning like a cooling tower when both sensible and latent heat removal are required, namely when ambient air temperatures are too high to allow cooling by sensible heat release only, or by functioning like a dry cooler when ambient temperatures are low enough (below approximately 75 F) to provide sufficient cooling. The advantage of this hybrid approach is that it requires less cooling water overall since it can function as a dry cooler when ambient temperatures permit, and it can still provide adequate cooling capacity when ambient temperatures require the use of evaporative cooling. The tower releases both sensible and latent heat into the atmosphere (7) either by convection or by fan assisted air flow.

The cooled water is pumped by chilled water pump (10) through pipe (9) to the heat exchanger inside the heat engine and returns to the cooling unit via pipe (8). Since some water is lost through evaporation, the cooling tower requires make-up water to replace the lost water. Cold water well (11) supplies this make-up water. Submersible pump (12) inside the well pumps water via pipe (13) to the cooling tower. The flow rate of the pump and pipe will be a function of the size of the electronic signals processing facility and local environmental conditions, but typical make-up water flow rate for the nominal 250 KW system is 8 to 10 gpm when operating in cooling tower mode and zero gpm when operating in dry cooler mode. An alternate source of make-up water could be from spent heating water diverted from pipe (4).

Referring to FIG. 8, the Heat Engine (8) extracts the thermal energy from geothermally heated water as previously described and releases thermal energy into the cooling water also as previously described and thereby generates high pressure hydraulic fluid which runs a hydraulic motor which turns an electrical generator shaft to generate electricity. The amount of electrical power generated is a function of both the amount of heat delivered to and removed from the heat engine. By varying the amount of heat delivered to and removed from the heat engine, the amount of power generated by it can be varied. In FIG. 8, hot geothermal water from a geothermal well (1) is pumped by a submersible pump (2) through pipes (3) and (4) and is returned to the ground through an injection well (5). A motorized modulating three-way control valve (6) is located in the hot water supply piping. As the valve position of this valve modulates it can send as much as 100% and as little as 0%, or any amount in between, of the hot water flow through the heat exchanger in the heat engine. Any flow portion which does not go to the heat engine is bypassed through the valve and returns directly to the injection well. In this way, the three-way valve controls the amount of flow of the constant temperature supply water and thus the amount of heat delivered to the heat engine. A similar piping and control valve arrangement is provided on the cooling water piping (9) so that the amount of cooling water delivered to the heat engine can also be varied. (An alternate piping arrangement can be used in which the three-way valve functions as a mixing valve and allows some of the water leaving the heat engine to be mixed with the hot supply water, thereby controlling the temperature of the water reaching the heat engine. This alternate method also controls the amount of heat delivered to the heat engine, but does so by regulating the inlet water temperature with a constant flow rate rather than regulating the flow rate while keeping a constant inlet temperature). In another embodiment, the controls described above are combined with a variable speed submersible pump. The pump speed varies in response to the control signal described below to provide a "gross" adjustment to flow rate, and the three-way valve provides a further refinement to the flow rate or inlet temperature.

A device is installed on the power lines to the computing equipment which continuously monitors the amount of electrical power which feeds that equipment. The device produces an output electrical signal which is proportional to the power consumption rate. This signal is fed to a control processor. The control processor also receives signals from temperature measuring devices on or in the hot water and cold water supply pipes. The control processor uses an algorithm which uses these inputs to produce a modulating output control signal which in turn operates the three-way control valves on the hot water and cooling water piping systems. In this way, the three-way control valves modulate in response to the power draw of the computing equipment, and the amount of electricity generated by the heat engine/ generator is adjusted. Each heat engine has a viable range of output, from approximately 100% to 60% of its nominal peak power rating (250 KW for the base case). By combining two or more heat engines operating under a single control system, the control system can also stage the heat engines in response to load variations. That is, a single engine can run at part to full load, and when total load required exceeds the output of a single engine, the second engine is staged on to contribute from 60% to 100% of its output, and so on. In this way, a larger variation in loads can be accommodated. A refinement which may be included is to incorporate a storage battery bank into the system. When the heat engine output does not exactly match the load requirement, excess electrical energy can be taken from or put into the battery bank so that the computing equipment always receives the precise amount of electric power it requires. The control processor will determine when energy is to be drawn from the battery bank and when it is to be sent to and stored in the battery bank.

Once data has been processed at the facility, the resulting processed data is transmitted back to the clients/users who supplied the raw data via fiber optic or microwave transmission.

Referring to FIG. 9, a site (1) with a total area of approximately one acre or more and located on that site a geothermal resource (2) which is a hot water well or other resource capable of supplying sufficient water at above 140 degrees F. and up to the boiling point of water or hotter, and piping (3) to move water from the geothermal resource to a heat engine (4) and generator (5) and piping (6) to move spent heating water from the heat engine to an injection well or other return receptacle such as a pond, lake, stream or ocean (7), and a cooling well or other source of cooling water (8) with piping (9) to move water from the cooling well to the heat engine (4) and generator (5) and piping (10) to move spent cooling water from the heat engine to an injection well or other return receptacle such as a pond, lake, stream or ocean (11), and enclosures which house Data Processing Modules (12), and an enclosure which houses a control system (13) for the electronic signals processing facility and an energy storage system such as a bank of storage batteries (15), and an Internet Connection such as fiber optic cable, microwave transmitters or other internet service (14), which deliver requests and connections to the electronic signals processing facility and returns processed data from the electronic signals processing facility to its clients or users.

FIG. 10 is a schematic illustration of an embodiment of an electronic signals processing facility and method. As depicted in FIG. 10, an Electronic Signals Processing Facility or Computing Facility can comprise an enclosed structure (10) (a pair of such structures are shown in FIG. 2) located on a one or more sites having a geothermal water well that can provide hot water at a temperature from 140 degrees Fahrenheit to the boiling point of water or hotter. By way of non-limiting example, the Eastern part of the State of Oregon in the United States has suitable sites with geothermal resources meeting required criteria including water temperature and quantity of available water. The geothermal resource sites can be tested to determine their temperature and flow characteristics prior to installation of the enclosed structure (10). The one or more sites can have an area typically larger than one acre. However, in alternate embodiments the one or more sites can encompass any desired area. In some embodiments, the enclosed structure (10) can be located on the site of the geothermal water well and can contain Data Processing Module "DPM" which generally refers to one or more computing devices running software configured to receive requests, typically over a network. However, in alternate embodiments, the DPM can be located on a separate site and electricity can flow from the Electricity Generator (14) to the Computing System (10) via a public or private electric grid and/or via any known, convenient and/or desired system, apparatus and/or mechanism adapted and configured to convey electricity from one locus to a second locus. A data processing module can comprise one or more servers connected to a network and running software configured to receive requests from other computing devices on the network, which may include other servers, and desktop and mobile computing devices, including cellular phones. Such data processing modules can comprise one or more processors, memory, input/output connections to a network and other electronic components and can comprise specialized computing devices such as blade servers, network routers, data acquisition equipment disc drive arrays, and other devices commonly associated with computing facilities. The controls for the electronic signals processing facility can comprise the following features and components: Raw, unprocessed digital data can be delivered to the electronic signals processing facility via fiber optic or microwave transmission networks operated by others. The data can be processed by electronic signals processing equipment located in the computing equipment enclosures which can be collocated on the same site as the electricity generator (14) or can be located in a locus different from the location of the electricity generator, according to algorithms provided by the supplier of the data. Additionally, in some embodiments, the data processing module of the electronic signals processing facility can be cooled via immersion in a dielectric fluid. The computing equipment which can perform the electronic signals processing runs on electricity, and the amount of electrical power used can be a function of the amount of data being processed. Processing larger amounts of data can demand a larger amount of electrical power. Because the amount of data being processed varies over time, the electrical power demand of the facility can also vary over time. A control system which regulates the flow of electricity to the processing equipment to match the changing load profile of the computing equipment can be employed.

FIG. 11 is a schematic cross-sectional illustration of a geothermal hot water well with a pressure activated water moving device (such as a submersible or other type of pump) in the well connected via piping to a heat engine, and a cold water well showing a pressure activated water moving device (such as a submersible or other type of pump) in the well connected via piping to the heat engine. In FIG. 11 a hot water supply well (1) can provide a source of geothermal hot water. The depth of the well depends on the depth of a hot water aquifer or geothermal resource at a particular site and can range from 150 ft to 1000 ft deep. However, in alternate embodiments, the depth can be any convenient and/or desired depth and in certain embodiments can range from 1200 ft to 6000 ft. In alternate embodiments, depths of 50' to 6000' can be employed and or any other known, convenient and/or desired range(s) within and encompassed by such depth range. The diameter of the well can vary depending on the amount of hot water available at the site and the desired hot water flow rate for the capacity of the electronic signals processing facility to be located at the disparate site/locus and can range from 6 inches to 24 inches and/or can have any known, convenient and/or desired range. Generally, as flow volume increases, the diameter can increase. In some embodiments, wherein the depth is between 1200 ft and 6000 ft, diameter can range from 6 in to 36 in. In some embodiments, the heat engine can run effectively to produce electricity using a relatively low temperature geothermal water source with water between 140 degrees F. and the boiling temperature of water or hotter. However, in alternate embodiments, other ranges can be employed. Thus, in some embodiments, the geothermal well can be relatively shallow since contact with water in above-described temperature range is desired. This is in contrast with other types of heat engines and turbines which require much higher temperature water and/or steam to operate efficiently and therefore require much deeper and more expensive wells to reach water at higher temperatures and pressures.

As depicted in FIG. 11, a submersible pump (2), in the hot water well, can pump water from the well to the heat engine via hot water supply pipe (3). The size of the pump and pipe can vary depending on the capacity required for a particular co-located or disparately located computing or other facility. The pump to serve a single heat engine with a nominal generating capacity of 250 Kilowatts can demand an approximate flow rate for the following temperatures:

220 gpm (gallons per minute) when the hot water supply is at 160 F
140 gpm when the hot water supply is at 185 F
105 gpm when the hot water supply is at 200 F In some embodiments, the system can produce water at a flow rate of 100 to 240 gallons per minute for each heat engine (8) being served and each heat engine (8) can produce a nominal output of 250 KW. Alternately, when the heat engine (8) differs from 250 KW, a pro-rated flow rate can be employed.

However, in alternate embodiments, any other known, convenient and/or desired flow rates and temperatures can be utilized.

Hot water from the supply well (1) can be pumped to the heat engine where it can pass through a heat exchanger which can be integral to the heat engine. The heat exchanger is where the water transfers its heat to the working fluid of the heat engine. The working fluid of the heat engine expands (without changing phase) and can drive a piston or pistons in the heat engine. The supply water which has released its useful heat can exit the heat exchanger and flows through pipe (4) to an injection well (5). The water can return to its source via the injection well. The capacity (gpm) of the injection well (5) to release water into the ground can be approximately the same as the supply rate of the pump (2) in the supply well (1).

Similarly, a cooling water supply well (6) can provide a source of cool ground water which can be used to cool the working fluid of the heat engine. After the working fluid at one end of the heat engine piston or pistons is heated and expands, the working fluid can be cooled and can contract so that the cycle can be repeated. The effect of the expansion of the working fluid on the piston(s) can be to generate motive power, which can be converted into electrical power via a hydraulic motor, electrical generator, and or any other known, convenient and/or desired machine and/or mechanism. The depth of the cold water well can vary depending on the depth of a cold water aquifer at a particular site and can range from 150 ft to 1000 ft deep and/or have any known convenient and/or desired range. The diameter of the well can vary depending on the amount of cold water available at the site and the demand for hot water flow rate for the capacity of the electronic signals processing facility to be co-located at the site and/or located in a disparate locus and can range from 6 inches to 36 inches and/or have any other known, convenient and/or desired range.

A submersible pump (7) in the cold water well can pump water from the well to the heat engine via cold water supply pipe (8). The size of the pump and pipe can vary depending on the demand for a particular co-located and/or disparately located electronic signals processing facility. The pump to serve a single heat engine with a nominal generating capacity of 250 Kilowatts can demand an approximate flow rate for the following temperatures:

156 gpm when the cold supply water is at 55 F
200 gpm when the cold supply water is at 65 F
280 gpm when the cold supply water is at 75 F However, in alternate embodiment any other known, convenient and/or desired flow rates and/or temperatures.

Cold water from the supply well (6) can be pumped to the heat engine where it passes through a heat exchanger which is integral to the heat engine. The heat exchanger is where the water removes heat from the working fluid of the heat engine. The working fluid of the heat engine can contract (without changing phase) and drive a piston or pistons in the heat engine. The supply water which has extracted heat from the heat engine working fluid can exit the heat exchanger and flows through pipe (9) to an injection well (10). The water can return to its source via the injection well. The capacity (gpm) of the injection well (10) to release water into the ground can be approximately the same as the supply rate of the pump (7) in the supply well (6). In alternate embodiments, the injection well can be absent and pipe (9) sends the spent cooling water to a pond, lake, stream, ocean or other site specific receptacle.

In operation, the generated electrical power can be delivered to a co-located DPM and/or delivered to a DPM situated at a disparate locus via a public or private power grid.

FIG. 12 is a schematic illustration of a facility/site (1200) housing computing equipment (1202) on the site of an alternate energy source(s) (1204). In the embodiment depicted in FIG. 12, the electricity generator (14) as described in relation to all embodiments described and depicted herein can be any known, convenient and/or desired alternate energy source or sources (1204). As depicted in FIG. 12, the alternate energy source can be one or more solar photovoltaic panels (1206) and/or one or more air/wind turbines (1208) operating individually and/or collectively and/or in cooperation. However, in alternate embodiments, any one or more known, convenient and/or desired alternative power sources can be employed and/or utilized.

In operation, power is derived from the alternate power source(s) (1204) and delivered to the co-located computing facility (1202) on the same site (1200).

FIG. 13 is a schematic illustration of an alternate embodiment of the piping and control valves (1300) which deliver heat from the geothermal bore (1302) to the heat engine (8). In the embodiment depicted in FIG. 13, water can be contained in a closed piping loop and can be pumped by an in-line pump (1304) through supply pipe (4) and through a heat exchanger (2) located inside the geothermal borehole or well (1302) where the water can be heated as the heat exchanger absorbs heat from the surrounding well water and/or hot rocks or other subsurface material and transfers this heat to the water. The water can flow through a return pipe (3) which can deliver the heated water to the heat engine (8), where the heat can be extracted from the water A motorized modulating three-way control valve (6) can be located in the hot water return piping to control the water temperature delivered to the heat engine (8). Any flow portion which does not go to the heat exchanger can be bypassed through the valve and can return to the engine. Thus, in operation, the three-way valve (6) can control the amount of flow through the heat exchanger (2) to provide a desired and controlled supply water temperature to the heat engine (8) and thus a controlled amount of heat energy can be delivered to the heat engine (8).

In some embodiments, the heat exchanger (2) in the bore hole can be as simple as a bare pipe which absorbs heat from its surroundings to a more complex engineered configuration with finned tubes, coils, metal plates or other features designed to increase the amount of heat energy which is absorbed by the heat exchanger and transferred to the water circulating in the closed loop.

This system (1300) for extracting geothermal heat does not require a second well or bore hole (1302) for re-injecting water which has been extracted from a below grade aquifer back into that aquifer, or otherwise disposing of the extracted water after it has been used.

In the embodiment depicted in FIG. 13, the Heat Engine (8) extracts the thermal energy from geothermally heated water as previously described and releases thermal energy into the cooling water also as previously described and thereby generates high pressure hydraulic fluid which runs a hydraulic motor which turns an electrical generator shaft to generate electricity. The amount of electrical power generated is a function of both the amount of heat delivered to and removed from the heat engine. By varying the amount of heat delivered to and removed from the heat engine, the amount of power generated by it can be varied. Other operations of this embodiment can, mutatis mutandis, as described in relation to FIG. 8.

The above presents a description of the best mode we contemplate of carrying out our electronic signals processing facility and method and of the manner and process of making and using them, in such full, clear, concise, and exact terms as to enable a person skilled in the art to make and use. Our electronic signals processing facility and method is, however, susceptible to modifications and alternate constructions from the illustrative embodiment discussed above which are fully equivalent. Consequently, it is not the intention to limit our electronic signals processing facility and method to the particular embodiment disclosed. On the contrary, our intention is to cover all modifications and alternate constructions coming within the spirit and scope of our electronic signals processing facility and method as generally expressed by the following claims, which particularly point out and distinctly claim the subject matter of our invention.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

The invention has been described above by way of illustration, and the specific embodiments disclosed are not intended to limit the invention to the particular forms disclosed. Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A geothermal source power plant, comprising,
   an electronic signals processing facility further comprising a first site having a geothermal resource that provides water temperature of at least 140 degrees Fahrenheit;
   a second site having an enclosure structure containing at least one data processing module further comprising at least one computing device running software configured to receive connections and requests, over a network, wherein said data processing module further comprises at least one server connected to a network and running software configured to receive requests from other network computing devices;
   a heat engine in communication with water from said geothermal resource operably connected to an electrical generator on said first site to drive the generator to provide electrical power for the data processing module; and
   a water moving device on said first site in communication with the geothermal resource to pump water from the geothermal resource to the heat engine;
   wherein the heat engine further comprises a first inlet in communication with—water from said heated water resource and a second inlet in communication with a fluid cooling system, said heat engine containing a drive mechanism engaged as heat is transferred from the heated water to a working fluid within the heat engine wherein heat is removed from the working fluid and transferred to the fluid in said cooling system, and said drive mechanism is operably connected with an electrical generator;
   wherein a data processing module further comprise at least one processor, memory, input/output connections to a network and other electronic components; and
   wherein the data processing module processes data delivered to said site from an external location, and receives electrical power from said geothermal source.

2. The geothermal power plant of claim 1, wherein the heat engine and generator are a unitary structure.

3. The geothermal power plant of claim 1 wherein the heat engine operates at an efficiency of at least 10 percent when driven by heated water having a temperature of at least 140 degrees Fahrenheit.

4. The geothermal power plant of claim 1, wherein the electronic processing facility:
wherein said enclosure structure containing at least one data processing module configured to process data delivered to said site from an external location;
wherein on said first site a heat engine in communication with heated water from said heated water resource and operably connected to an electrical generator on said site to drive the generator to provide electrical power for at least one of the electronic signals processing facility and the data processing module; and
wherein said first site further comprises a control system that regulates the rate at which electrical power is supplied to the data processing module as a function of the demand rate for computing.

5. The geothermal power plant of claim 1:
wherein the heat engine further comprises a first heat exchanger where heat is transferred from the geothermal source heated water to the heat engine's working fluid, and a second heat exchanger wherein heat is transferred from the heat engine's working fluid to cooling system water which removes the heat from the heat engine.

6. The geothermal power plant of claim 1:
wherein the heat engine further comprises a water moving device in communication with a water source to move water from the water source to the heat engine to affect the supply of heat to the heat engine, and said water moving device is in communication with a water source to move water from said source to the heat engine to affect the removal of heat from the heat engine.

7. The geothermal power plant of claim 1:
wherein the heat engine is a hydraulic heat engine which operates with a working fluid at supercritical conditions, and wherein the fluid expands due to thermal expansion when heated without phase change from liquid to gas and the expansion moves a piston in a cylinder to compress a hydraulic fluid which powers a hydraulic motor to turn the shaft of said electric generator to produce electricity, and the working fluid contracts when cooled by the cooling source it contracts and the piston is positioned for a repeat of the heating/cooling cycle.

8. The geothermal power plant of claim 4 wherein the enclosure structure of the electronic signals processing facility is a permanent structure built on the second site.

9. The geothermal power plant of claim 4 wherein the enclosure structure is portable.

10. The geothermal power plant claim 4
wherein the heated water source is located at a depth in the range of 50 feet to 6000 feet and is accessed via an access channel having a diameter in the range of 6 inches to 36 inches;
wherein the heated water source produces water at a temperature of at least 140 degrees F.;
wherein the heated water source produces water at a flow rate in the range of 170±70 gallons per minute for each heat engine being served when each heat engine has a nominal output capacity of approximately 250 KW, and a pro-rated flowrate when the heat engine output is greater or less than approximately 250 KW.

11. The geothermal power plant of claim 4:
wherein the heat engine, electrical generator and the data processing module have a control system and an energy storage system wherein the control system regulates the amount of electrical power which is generated at the site and the amount of electrical power which is delivered to the data processing module so that the data processing module receives demanded power, said demanded power varying over time as a function of the computing tasks carried out by the data processing module;
wherein said first site comprises an energy storage system which receives and stores excess power when the generating system produces more power than the computing facility requires and delivers power to the electronic signals processing facility when the generating system produces less power than the electronic signals processing facility requires.

12. The geothermal power plant of claim 4, wherein said electronic signals processing facility comprises an electrical energy storage system comprising electrical storage components adapted and configured to store and release electrical energy, wherein at least some of the electrical energy generated by the generator is stored on the second site.

13. The geothermal power plant of claim 4, wherein the data processing module of the electronic signals processing facility is cooled via immersion in a dielectric fluid.

14. The geothermal power plant of claim 4, wherein the electronic signals processing facility at said second site is associated with an electric power grid and operates on power transmitted from said first site via said power grid.

15. The geothermal power plant of claim 4, wherein the heat engine is cooled using water from a chilled water source on site.

16. The geothermal power plant of claim 4, wherein the heat engine is cooled using a cooling system that ejects heat into the atmosphere.

17. The geothermal power plant of claim 1 wherein a first heat exchanger adapted and configured to transfer heat from the geothermal source to heated water in a closed loop and to the heat engine's working fluid, is located within a geothermal bore.

* * * * *